Aug. 14, 1962 L. H. BARNES 3,048,958
VACUUM BREAKER DEVICE FOR TANK CARS
Filed July 13, 1960

INVENTOR.
LESTER H. BARNES
BY
ATTORNEY

United States Patent Office 3,048,958
Patented Aug. 14, 1962

3,048,958
VACUUM BREAKER DEVICE FOR TANK CARS
Lester H. Barnes, Ponca City, Okla., assignor to Continental Oil Company, Ponca City, Okla., a corporation of Delaware
Filed July 13, 1960, Ser. No. 42,537
1 Claim. (Cl. 55—316)

This invention deals generally with vacuum breakers and in particular with a vacuum breaker adapted for use with oil tank cars which is designed specifically to prevent the entry of moisture and dirt into the tank thereby eliminating the main source of product contamination.

It is a common practice to transport products such as petrochemicals or hydrocarbons by means of a tank car. The product is inserted into the tank car which may be either a railroad tank car or a truck, and the car sealed to prevent entrance of moisture, dust, and other contaminates from entering within the tank thereby contaminating the product contained therein. The seals incorporated to prevent the entrance of the contaminates must, however, provide for relief from a pressure if such should develop within the tank during the transportation of the hydrocarbons. A vacuum however may easily develop if the car passes through a sudden climatic change as, for example, a rain storm, since the rain will cause rapid cooling of the car and substantial reduction of the pressure of the air within the tank. This reduction in pressure would be sufficient to cause air to enter the tank through any leaks in the seals of the car, for example, around the threads of the relief valves or loading manholes located in the dome mounted on the top of the tank. The air entering the tank will carry with it the dust, dirt, and moisture which it usually contains. The hazard from the introduction of water is greatly increased during a rain storm since the reduction of pressure will occur almost simultaneously with the entry of the car into the shower zone of the storm thereby permitting the entry of moisture-laden air.

It is therefore an object of this invention to provide a vacuum relief valve which will filter out contaminating dust particles from the pressure relieving air entering the inside of the tank.

It is a further object of this invention to provide an air drying agent which is adapted to remove the moisture from the pressure relieving air prior to its entry into the tank car.

It is a still further object of this invention to provide a pressure relieving valve which will not only remove the contaminating particles from the air but will also remove the moisture from the air prior to the introduction of the air within the storage area of the tank car.

This invention features a pressure relieving valve adapted to pass air from the outside of the tank to the inside of the tank which comprises a first protective lid enclosing a second cylindrical container, said cylindrical container confining therein a drying agent and a semi-porous filter. A check valve is mounted through the wall of the inner cylinder chamber and adapted to communicate between the inner cylinder container and the interior portion of the tank such that air will pass through the drying agent and the filter prior to its passage through the vacuum breaker and into the storage area of the tank.

Further objects, features, and advantages of the invention will become apparent from the following description and claim when read in view of the accompanying drawings, in which:

Figure 1:
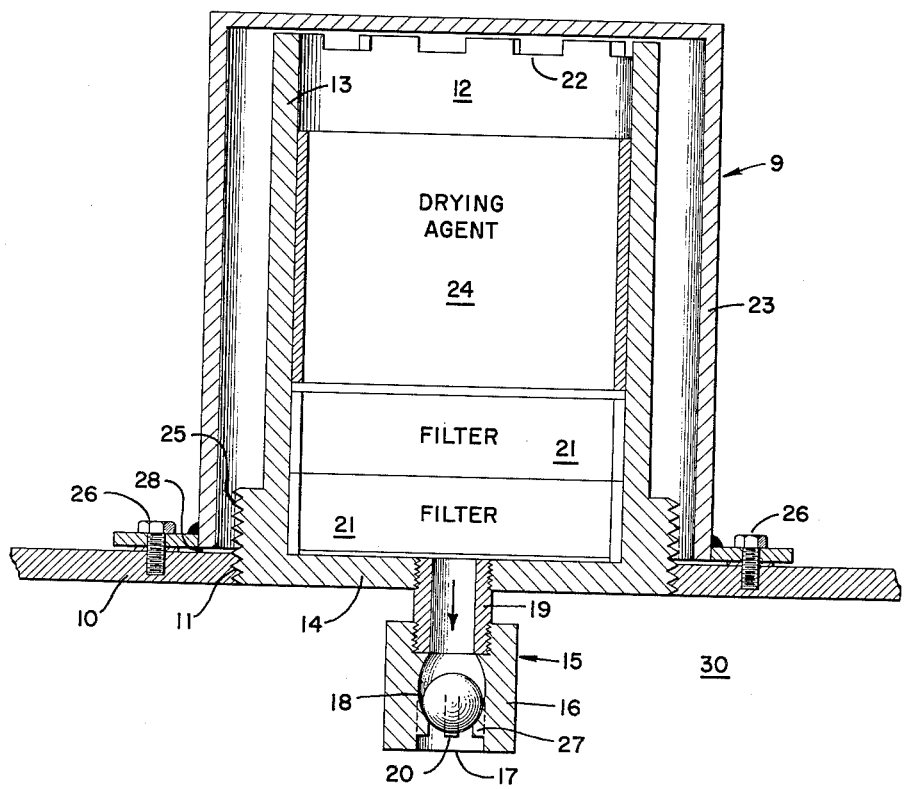
FIG. 1 is a cross-sectional view of the vacuum breaker.
Figure 2:
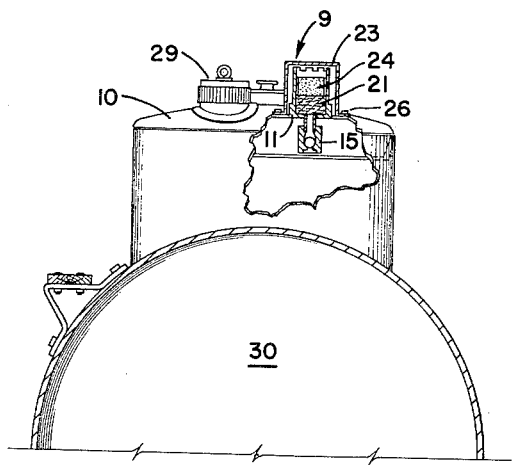
FIG. 2 is a partial section of the end view of a tank car with the vacuum breaker installed in one of the pressure relief valve ports.

Referring to the drawings, a vacuum breaker 9 is shown which may be mounted through the usual relief valve opening in a tank car dome 10. A portion of the tank car dome 10 has a threaded hole 11 made therethrough which is usually adapted to receive a standard relief valve of the type well known in the industry for relieving pressure within a tank car if such should be formed under climatic changes. An increase in pressure could be obtained, for example, by a sudden increase in heat such as the heating of the tank car during a hot day. The increase in pressure would normally be caused by an increase in the vapor pressure within the tank. This variation in pressure within the tank car is controlled by the relief valve 29 which permits vapor to leave the tank car. Since a decrease in pressure within the tank car cannot be relived by relief valve 29, air will enter through any leaks in the tank 30, usually around the dome where the loading manhole and relief valves are located.

Within the normal relief opening 11 of the tank car is inserted an inner container 12 which has cylindrical sides 13 and a bottom 14. A well known ball check valve 15 is inserted axially through the bottom 14 of inner container 12. Check valve 15 may be of any well known configuration and generally includes valve portion 16 which has an inner communicating channel 17, valve portion 18, and connecting pipe 19. Valve portion 18 contains a ball valve 20 which is adapted to close communicating channel 17 if the car should be upset, thereby confining the contents. The lower portion of the check valve has a plurality of bosses 27 which permit air to freely pass around the ball as the air enters or leaves the tank.

Contained within cylinder 12 is a filter 21 and a drying agent 24. The drying agent may be of any well known drying agent such as silica gel. The outer portion of inner cylinder 12 contains a plurality of threads 25 adapted to mate with the threads of the relief valve hole 11. The top of inner cylinder 12 has a plurality of slots 22 which operate as air ports thereby permitting air to flow freely between the interior of the inner cylinder and the outside surrounding air. Slots 22 also provide for a method of anchoring a wrench or other device used to screw inner housing 12 into relief valve opening 11. Inner cylinder 12 is protected from the elements such as rain, dirt, and wind by an outer cylinder or protective cover 23 which is attached rigidly to the tank car by means such as bolt 26. Protective cover 23 contains an air space 28 around the bottom to provide for the entry or exit of air to the valve.

In operation, air is permitted to enter tank 30 from the outside by passing through ports 28 and slots 22, drying agent 24, filters 21, around ball valve 20, and into the tank 30. An increase of pressure in the tank will likewise permit the air to pass by ball valve 20, through filters 21, drying agent 24, and slot 22 to the outside. In all cases, however, the moist air must pass through drying agent 24 and filter 21 prior to entering tank 30. This will therefore insure that only dry air will enter the tank portion 30 containing the stored product. It is understood that an adequate amount of drying agent 24 must be stored within cylinder 12 in order to provide sufficient drying during the entire trip of the tank car. During extended trips or storage, however, it is obvious that the drying agent may be removed and changed. So long as the change is accomplished during normal environmental conditions, no moisture should enter the storage compartment of the tank car since little or no variation in pressure would be present during the change.

It is obvious to one skilled in the art that the novel vacuum breaker may be installed anywhere on the tank car above the level of the stored products. However, a hole similar to relief valve hole 11 would have to be bored through the tank car wall. Other means for attaching the inner cylinder to the tank car may be employed such as welding or press fitting or bolting which is within the ability of one skilled in the art without departing from the spirit and scope of this invention. It is further obvious that ball relief valve 15 may be located anywhere in the bottom 14 of inner cylinder 12 provided the air passes through the drying agent and filters prior to its passage into the tank 30 of the tank car.

Although this invention has been described with respect to particular embodiments thereof, it is not to be so limited, as changes and modifications may be made therein which are within the spirit and scope of the invention as defined by the appended claim.

I claim:

A vacuum breaker and air drying apparatus for a movable storage tank car having a liquid confined therein and having an opening therethrough above the level of said liquid, comprising:

(a) an inner cylindrical container having a side wall and a bottom;

(b) means for attaching the bottom portion of said inner cylindrical container over the opening in the tank on said tank car;

(c) a vacuum breaker and spillage prevention valve attached to the outside of the bottom of said inner cylindrical container and extending therefrom and having a communicating passage therethrough and into said cylindrical container, a ball valve within said communicating passage adapted to permit air to pass therethrough when said tank car is properly oriented, and to prevent spillage of fluid through said communicating passage when said tank car is overturned;

(d) a drying agent and a filter means confined within the side walls of said inner cylindrical container, said filter adapted to remove contaminating particles from the air flowing into said tank and said drying agent adapted to remove moisture from the air flowing into said tank;

(e) an outer cylindrical container surrounding said inner cylindrical container and having side walls and a top;

(f) mounting means for attaching said outer cylindrical container securely around said inner container; and (g) means for passing air through the bottom of said outer cylindrical container and through the top of said inner cylindrical container;

whereby liquid within a tank will be prevented from contamination by dirt and moisture-laden air entering said tank when a sudden vacuum is created within said tank by rain or large temperature change by permitting the air to enter through the bottom of said outer container, the top of said inner container, and by cleaning and drying before entering said tank to relieve the vacuum therein.

References Cited in the file of this patent

UNITED STATES PATENTS

| | | |
|---|---|---|
| 924,587 | Sharp | June 8, 1909 |
| 1,476,618 | Jones | Dec. 4, 1923 |
| 1,601,308 | Hill | Sept. 28, 1926 |
| 2,738,796 | Chadwick | Mar. 20, 1956 |
| 2,830,671 | Robbins | Apr. 15, 1958 |
| 2,976,950 | Smith | Mar. 28, 1961 |